(12) United States Patent
Cheah et al.

(10) Patent No.: US 7,565,472 B2
(45) Date of Patent: Jul. 21, 2009

(54) HOST BASED AUTOMATIC DETECTION UNIT

(75) Inventors: Chee Sin Cheah, Singapore (SG); Huoy Ru Rachel Koh, Singapore (SG); Hiap Chew Chua, Singapore (SG); Kok Ghay Wong, Singapore (SG)

(73) Assignee: Creative Technology Ltd, Singapore (SG)

( * ) Notice: Subject to any disclaimer, the term of this patent is extended or adjusted under 35 U.S.C. 154(b) by 91 days.

(21) Appl. No.: 11/740,832

(22) Filed: Apr. 26, 2007

(65) Prior Publication Data

US 2008/0270637 A1     Oct. 30, 2008

(51) Int. Cl.
*G06F 13/00* (2006.01)
*G06F 3/00* (2006.01)

(52) U.S. Cl. .......................... 710/300; 710/104; 710/8; 710/15; 710/29; 710/58

(58) Field of Classification Search ......... 710/300–304, 710/104–106, 305–316, 8–15, 29–32, 58
See application file for complete search history.

(56) References Cited

U.S. PATENT DOCUMENTS

| | | | | |
|---|---|---|---|---|
| 5,457,785 A | * | 10/1995 | Kikinis et al. | 710/307 |
| 5,648,762 A | * | 7/1997 | Ichimura et al. | 726/34 |
| 5,664,118 A | * | 9/1997 | Nishigaki et al. | 710/304 |
| 5,901,292 A | * | 5/1999 | Nishigaki et al. | 710/304 |
| 6,044,428 A | | 3/2000 | Rayabhari | |
| 6,438,640 B1 | * | 8/2002 | Miyamoto et al. | 710/303 |
| 6,970,965 B2 | * | 11/2005 | Kang et al. | 710/304 |
| 2004/0088452 A1 | * | 5/2004 | Scott | 710/62 |
| 2004/0145606 A1 | * | 7/2004 | Jones | 345/743 |
| 2006/0223486 A1 | | 10/2006 | Ruff et al. | |
| 2007/0028006 A1 | * | 2/2007 | Laefer et al. | 710/1 |
| 2007/0234420 A1 | * | 10/2007 | Novotney et al. | 726/16 |
| 2007/0250653 A1 | * | 10/2007 | Jones | 710/303 |
| 2007/0300155 A1 | * | 12/2007 | Laefer et al. | 715/700 |

FOREIGN PATENT DOCUMENTS

GB          2389429 A        12/2003

* cited by examiner

*Primary Examiner*—Christohper B Shin

(57) ABSTRACT

There is provided several embodiments of the present invention, the invention being an automatic detection unit allowing for coupling of an external device with a host. The unit may connect to an external device either via wired or wireless means. The host may be activated from a standby mode by the external device and the external device may be identifiable by the host (or a verifier). Identification of the external device by the host allows identification of at least one data format type transmitted by the external device when data is transferred from the external device to the host. This may enable processing of the data by the host, such as, for example, storage, playback or both of the aforementioned.

18 Claims, 5 Drawing Sheets

| Pin | Signal Name | Signal Description |
|---|---|---|
| 1 | USB VBus | USB power detect / Charger input |
| 2 | Serial Data RxD / USB D+ | Serial protocol / USB signal |
| 3 | Serial Data TxD / USB D- | Serial protocol / USB signal |
| 4 | USB GND | Data ground |
| 5 | Reserve | |
| 6 | Vout | Accessory power, 3V3 |
| 7 | DGnd | Accessory ground |
| 8 | Alert Signal | Accessory wake up signal |
| 9 | Accessory Detect | Accessory detect signal |
| 10 | Reserve | |
| 11 | Line in L | Audio line in – Left |
| 12 | Line in R | Audio line in – Right |
| 13 | Line out L | Audio line out – Left |
| 14 | Line out R | Audio line out – Right |
| 15 | Audio Gnd | Audio ground |
| 16 | Reserve | |
| 17 | Mic Input + | Mic input positive |
| 18 | Mic Input - | Mic input negative |

FIGURE 3

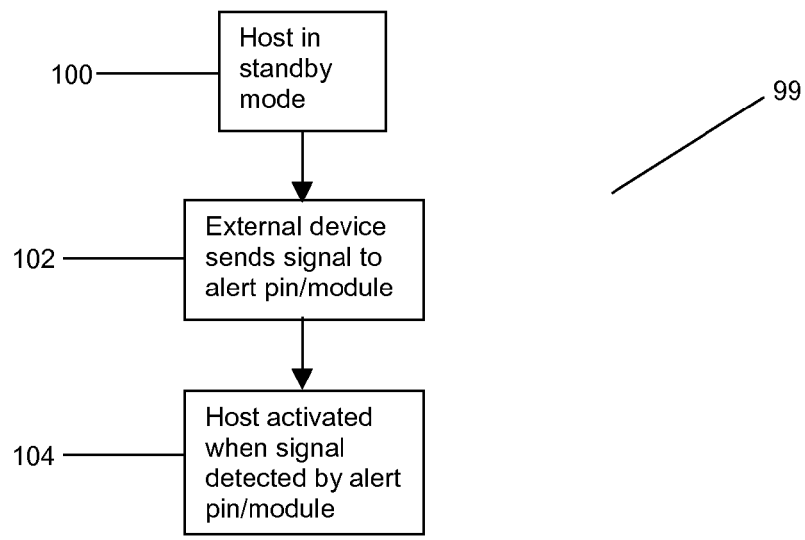

FIGURE 4

HOST BASED AUTOMATIC DETECTION UNIT

FIELD OF THE INVENTION

The present invention relates to an automatic detection unit located within a host device for detection of an external device coupled to the host device.

BACKGROUND

In recent years, the portable electronics device market has been growing at an exponential rate, and advances in technology enable such devices to have increasing data storage sizes. Data stored by such devices include, for example, voice, audio, data, video signals (in compressed or uncompressed forms) and the like. In this regard, it is inevitable that the need to share and/or transfer the stored data exists in this age of information sharing.

It is preferable that the sharing and/or transfer of stored data are made to be convenient for a user. It is also preferable that the sharing and/or transfer of stored data are not constrained by a type of portable device that the data is stored on. Users of such portable devices prefer to have flexibility with regard to the sharing and/or transfer of stored data in relation to how and where the data is shared or transferred.

The present invention aims to meet the aforementioned demands of users of such devices.

SUMMARY

In a first embodiment of the present invention, there is provided an automatic detection unit allowing for coupling of an external device with a host. The unit includes a connector having a plurality of connector pins; and an identification pin arranged within the plurality of connector pins. Preferably, the identification pin enables interaction between the external device and the host. The automatic detection unit may further include an alert pin arranged within the plurality of connector pins, with the alert pin preferably enabling interaction between the external device and the host such that the host is activated from a standby mode by the external device when the alert pin receives a signal from the external device. A verifier for verifying a signal from the external device may also be included.

The unit may be able to be de-coupled from the host.

The host may preferably be, for example, a dock, a sound reproduction apparatus or a jack. The external device may preferably be, for example, either a media player or a mobile phone.

The interaction between the external device and the host through the identification pin may include the external device transmitting a signal to the host; and verification of the signal by the host. It is advantageous that identification of the external device by the host (or verifier) enables identification by the host of at least one data format type transmitted by the external device when data is transferred from the external device to the host. This may enable processing of the data by the host, such as, for example, storage, playback or both of the aforementioned.

In a second embodiment of the present invention, there is provided an automatic detection unit (that can be de-coupled from the host) allowing for coupling of the external device with a host, the unit including a signal receiver, and an identification module incorporated within the signal receiver. It is advantageous that the identification module enables interaction between the external device and the host. The automatic detection unit may further include an alert module which enables interaction between the external device and the host such that the host is activated from a standby mode by the external device when the alert module receives a signal from the external device. The automatic detection unit may further include a verifier for verifying a signal from the external device.

The host may preferably be for example, a dock, a sound reproduction apparatus or a jack. The external device may be a digital device like either a media player or a mobile phone.

In this second embodiment, the interaction between the external device and the host through the identification module includes the external device transmitting a signal to the host; and verification of the signal by the host. It is advantageous that identification of the external device by the host enables identification by the host of at least one data format type transmitted by the external device when data is transferred from the external device to the host.

Consequently, identification by the host of at least one data format type transmitted by the external device enables processing of the data by the host, such as, for example, storage, playback or both of the aforementioned.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

FIG. 3 shows an example of pin count and signal arrangement of a connector in the first embodiment of the present invention.

FIG. 4 shows a process flow for activating a host from a standby mode to "power on" mode in an embodiment of the present invention.

DESCRIPTION OF PREFERRED EMBODIMENTS

Figure 1:
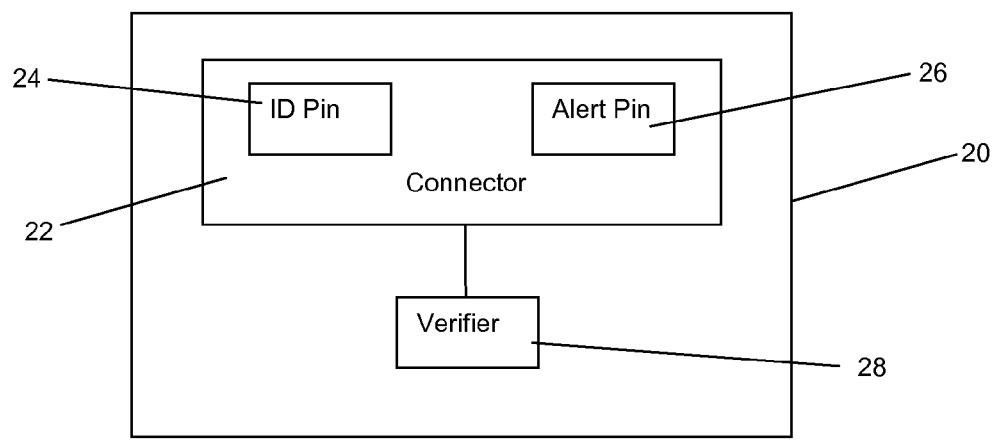
FIG. 1 shows a block diagram of a first embodiment of the present invention.

Referring to FIG. 1, there is shown a block diagram of a first embodiment of the present invention in the form of an automatic detection unit 20 for coupling of an external device with a host. The automatic detection unit 20 may be coupled to a host and the automatic detection unit 20 allows for coupling of the external device with the host. The external device may be, for example, a media player or a mobile phone. The automatic detection unit 20 may be an add-on device that may be connected to the host when required.

The automatic detection unit 20 may include a connector 22 having a plurality of connector pins. One of the pins may be an identification pin 24 and another pin may be an alert pin 26. The identification pin 24 may enable interaction between the external device and the host such that the host is able to identify the external device. Similarly, the alert pin 26 may enable interaction between the external device and the host such that the host is activated from a standby mode by the external device when the alert pin 26 receives a signal from the external device. The automatic detection unit may also include a verifier 28 for processing a signal from the external device. The operation of the automatic detection unit 20 will be described in a later portion of this section.

FIG. 3 shows a non-limiting representative example of a pin count and signal arrangement of the connector 22 in the first embodiment of the present invention. In this instance, pin 9 is the identification pin 24 while pin 8 is the alert pin 26. In this example, the connector 22 has eighteen pins. The connector 22 may have more or less pins and it should be noted that the identification pin 24 and alert pin 26 may be incorporated into any standard or proprietary connector arrangements.

Figure 2:
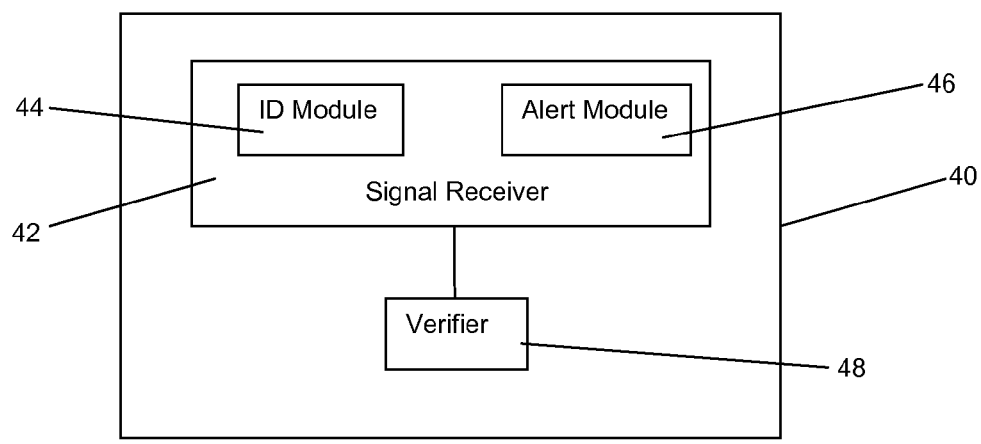
FIG. 2 shows a block diagram of a second embodiment of the present invention.

Referring to FIG. 2, there is shown a block diagram of a second embodiment of the present invention in the form of an automatic detection unit 40 for wirelessly coupling an external device with a host. The automatic detection unit 40 may be coupled to a host and the automatic detection unit 40 allows for coupling of the external device with the host. The external device may be, for example, a media player or a mobile phone. The automatic detection unit 40 may be an add-on device that may be connected to the host when required.

The automatic detection unit 40 may include a signal receiver 42. The signal receiver 42 may include an identification module 44 and an alert module 46. The identification module 44 may enable interaction between the external device and the host such that the host is able to identify the external device. Similarly, the alert module 46 may enable interaction between the external device and the host such that the host is activated from a standby mode by the external device when the alert module 46 receives a signal from the external device. The automatic detection unit 40 may also include a verifier 48 for processing a signal from the external device. The operation of the automatic detection unit 40 will be described in a later portion of this section.

FIG. 4 shows a process flow (99) for activating a host from a standby mode to "power on" mode when using the present invention. The present invention may be incorporated with the host device such as, for example, a dock, a sound reproduction device, a jack and the like. In an instance where the host device is in a standby mode (100), a connection (wired or wireless) between the external device and the host device enables a signal to be transmitted from the external device to the present invention such that the alert pin 26/alert module 46 receives the signal from the external device (102). The host device is subsequently activated to the "power on" mode when the signal from the external device is detected by the alert pin 26/alert module 46 (104).

Figure 6:
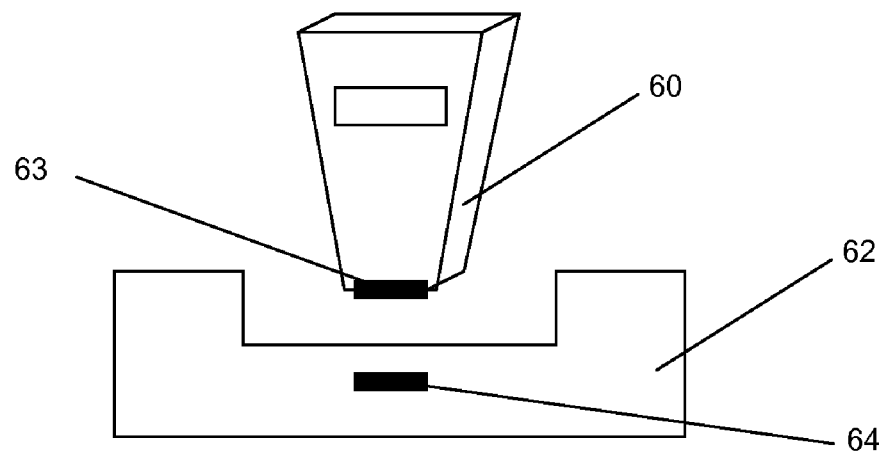
FIG. 6 shows a first application of the present invention.

FIGS. 6-9 show various applications of the present invention. In FIGS. 6-9, the representative external device 60 is a media player. FIG. 6 shows a media player dock 62 as the host for the external device 60. The media player 60 may be for connection to other devices. An automatic detection unit 64 of the form as described earlier in either the first or second embodiment may be incorporated in the dock 62.

Figure 7:
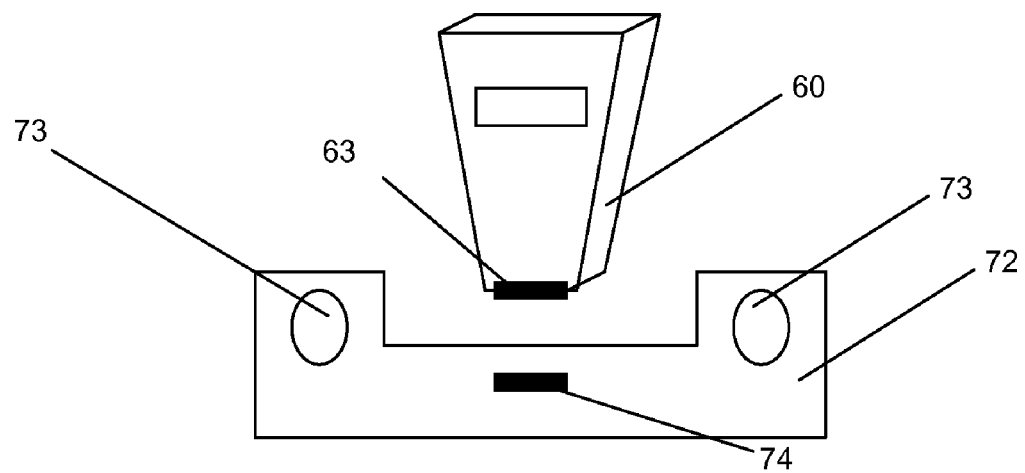
FIG. 7 shows a second application of the present invention.
Figure 8:
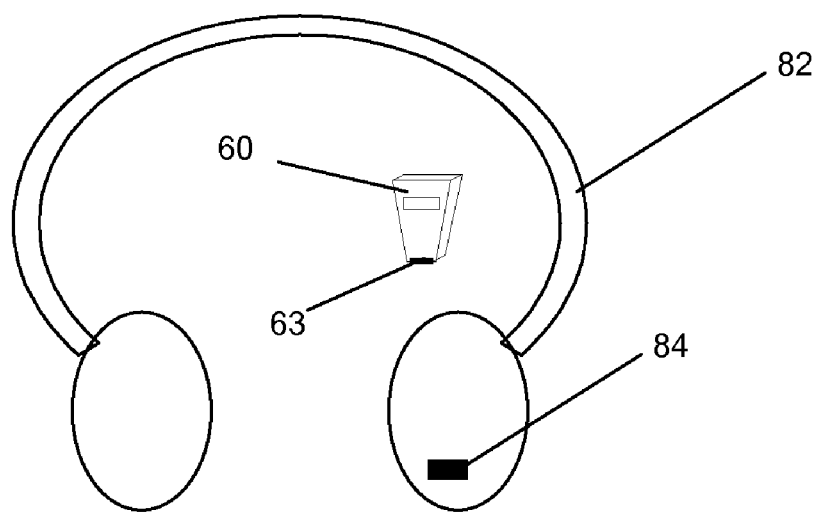
FIG. 8 shows a third application of the present invention.
Figure 9:
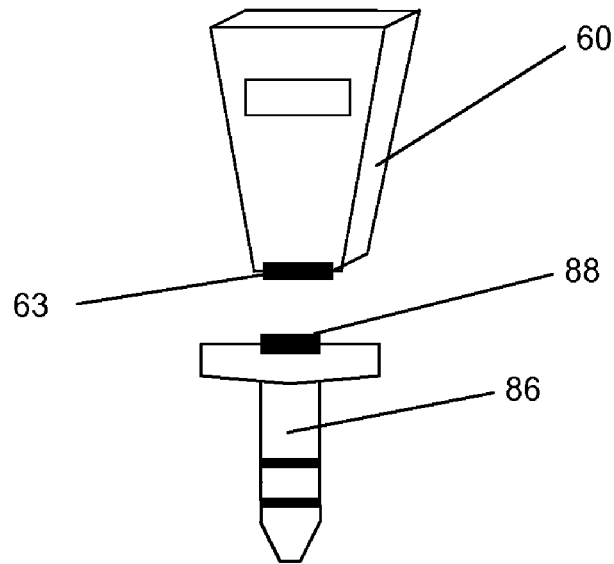
FIG. 9 shows a fourth application of the present invention.

FIGS. 7 and 8 show different forms of sound reproduction apparatus as the host for the external device 60. FIG. 7 shows a set of speakers 72 with speaker drivers 73 as the host while FIG. 8 shows a headset 82 as the host for the external device 60. An automatic detection unit 74 of the form as described earlier in either the first or second embodiment may also be incorporated in the set of speakers 72 and headset 82. It should be noted that the automatic detection unit 64/74/84 as denoted in FIGS. 6-8 enable the host to detect the external device and be activated from standby mode by the external device when the external device 60 is connected to the host 62/72/82 either through a physical connection (the connector 63 that couples with the automatic detection unit 64/74/84) or wirelessly. In FIG. 9, the host is a jack 86, enabling the external device 60 to be connectable to an apparatus that is able to functionally couple with the jack 86 either through a physical connection (the connector 63 that couples with an automatic detection unit 88) or wirelessly.

Figure 5:
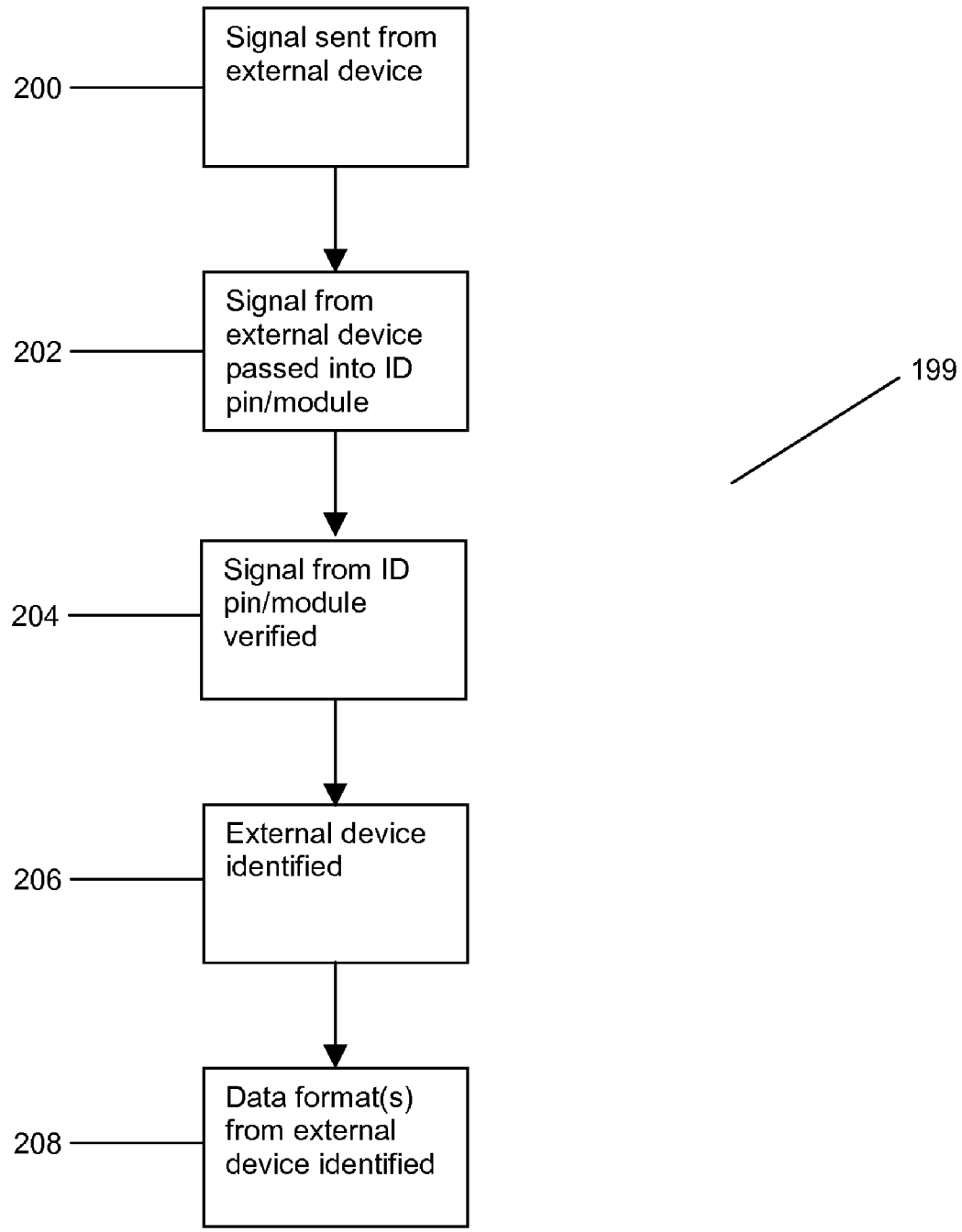
FIG. 5 shows a process flow for transferring data between an external device and a host in an embodiment of the present invention.

Referring to FIG. 5, there is provided a process flow (199) for transferring data between an external device and a host using an embodiment of the present invention. In a host device incorporated with the automatic detection unit 20/40, the automatic detection unit 20/40 enables the host to process signals transmitted from the external device. When the signal is transmitted from the external device (200), the signal is received by the automatic detection unit 20/40 and subsequently passed into an identification pin 24/an identification module 44 (202). The signal passed into the identification pin 24/identification module 44 is then verified by verifier 28/48 (204). It should be noted that packet bits in the signal may vary depending on the data form that is transmitted by the external device. The variation in the packet bits may be addressed by the verifier 28/48 by varying verification parameters of the verifier 28/48.

Verification of the signal enables identification of the external device by the host (206). The identification of the external device may be done using a look-up table with a particular external device or grouping of external devices corresponding to particular signals received by the identification pin 24/identification module 44. Correspondingly, at least one data format transmitted by the external device is also identified (208). As such, identification of the external device by the host enables processing of the transmitted data by the host, the processing including storage, playback or both of the aforementioned.

The automatic detection unit 20/40 may also be configured to identify only the signals received by the identification pin 24/identification module 44 such that the requisite routines to be performed in the host are activated to enable the transmitted data to be processed without identifying the external device. In such an instance, only the transmitted signals from the external device are identified, meaning that step 206 in process 199 is omitted.

Whilst there has been described in the foregoing description preferred embodiments of the present invention, it will be understood by those skilled in the technology concerned that many variations or modifications in details of design or construction may be made without departing from the present invention.

The invention claimed is:

1. An automatic detection unit allowing for coupling of an external device with a host, the unit including:
   a connector having a plurality of connector pins;
   an identification pin arranged within the plurality of connector pins; and
   a verifier for verifying a signal passed into the identification pin from the external device,
   wherein the identification pin enables interaction between the external device and the host and variation in data format in the signal is addressable by the verifier by varying verification parameters of the verifier.

2. The automatic detection unit as claimed in claim 1, further including an alert pin arranged within the plurality of connector pins, wherein the alert pin enables interaction between the external device and the host such that the host is activated from a standby mode by the external device when the alert pin receives a signal from the external device.

3. The automatic detection unit as claimed in claim 2, wherein the host is selected from a group consisting of: a dock, a sound reproduction apparatus and a jack.

4. The automatic detection unit as claimed in claim 3, wherein the external device is a digital device selected from a group consisting of: a media player and a mobile phone.

5. The automatic detection unit as claimed in claim 1, wherein the interaction between the external device and the host through the identification pin includes:
   transmission of a signal from the external device to the host;
   identification of the external device; and
   identification by the host of at least one data format type for transmission by the external device as based on the identification of the external device.

6. The automatic detection unit as claimed in claim 5, wherein the identification by the host of at least one data format type transmitted by the external device enables processing of the data by the host, the processing selected from the group consisting of: storage, playback and both of the aforementioned.

7. The automatic detection unit as claimed in claim 1, wherein the unit can be de-coupled from the host.

8. The automatic detection unit as claimed in claim 5, wherein the identification by the host of at least one data format type transmitted by the external device enables processing of the data by the host, the processing selected from the group consisting of: storage, playback and both of the aforementioned.

9. An automatic detection unit allowing for coupling of an external device with a host, the unit including:
   a signal receiver;
   an identification module incorporated within the signal receiver and
   a verifier for verifying a signal passed into the identification module from the external device,
   wherein the identification module enables interaction between the external device and the host and variation in data format in the signal is addressable by the verifier by varying verification parameters of the verifier.

10. The automatic detection unit as claimed in claim 9 further including an alert module, wherein the alert module enables interaction between the external device and the host such that the host is activated from a standby mode by the external device when the alert module receives a signal from the external device.

11. The automatic detection unit as claimed in claim 10 wherein the host is selected from a group consisting of: a dock, a sound reproduction apparatus and a jack.

12. The automatic detection unit as claimed in claim 11 wherein the external device is a digital device selected from a group consisting of: a media player and a mobile phone.

13. The automatic detection unit as claimed in claim 9 wherein the interaction between the external device and the host through the identification module includes:
   the external device transmitting a signal to the host; and
   verification of the signal by the host,
   wherein identification of the external device by the host enables identification by the host of at least one data format type transmitted by the external device when data is transferred from the external device to the host.

14. The automatic detection unit as claimed in claim 13, wherein the identification by the host of at least one data format type transmitted by the external device enables processing of the data by the host, the processing selected from the group consisting of: storage, playback and both of the aforementioned.

15. The automatic detection unit as claimed in claim 9, wherein the unit can be de-coupled from the host.

16. The automatic detection unit as claimed in claim 9, wherein the identification by the host of at least one data format type transmitted by the external device enables processing of the data by the host, the processing selected from the group consisting of: storage, playback and both of the aforementioned.

17. A method for detecting characteristics of a data signal sent from an external device to a host device, the method comprising:
   receiving a first signal over an identification pin located on a connector coupled to the host device, said connector having a plurality of pins for electrically coupling the host device to the external device;
   verifying the first signal to enable
      identifying the external device based on the characteristics of the first signal; and
      determining the format of the data signal based on the characteristics of the first signal; and
   varying verification parameters to address variation in data format in the first signal.

18. The method as recited in claim 17 further comprising detecting an alert signal over a second pin of the connector; and
   activating the host device in response to the detection, wherein the activated host device is enabled for at least one of storage or playback of the data signal.

* * * * *